(No Model.)
J. WINTER, Sr.
PHOTOGRAPHIC POSING CHAIR.
No. 506,025.          Patented Oct. 3, 1893.
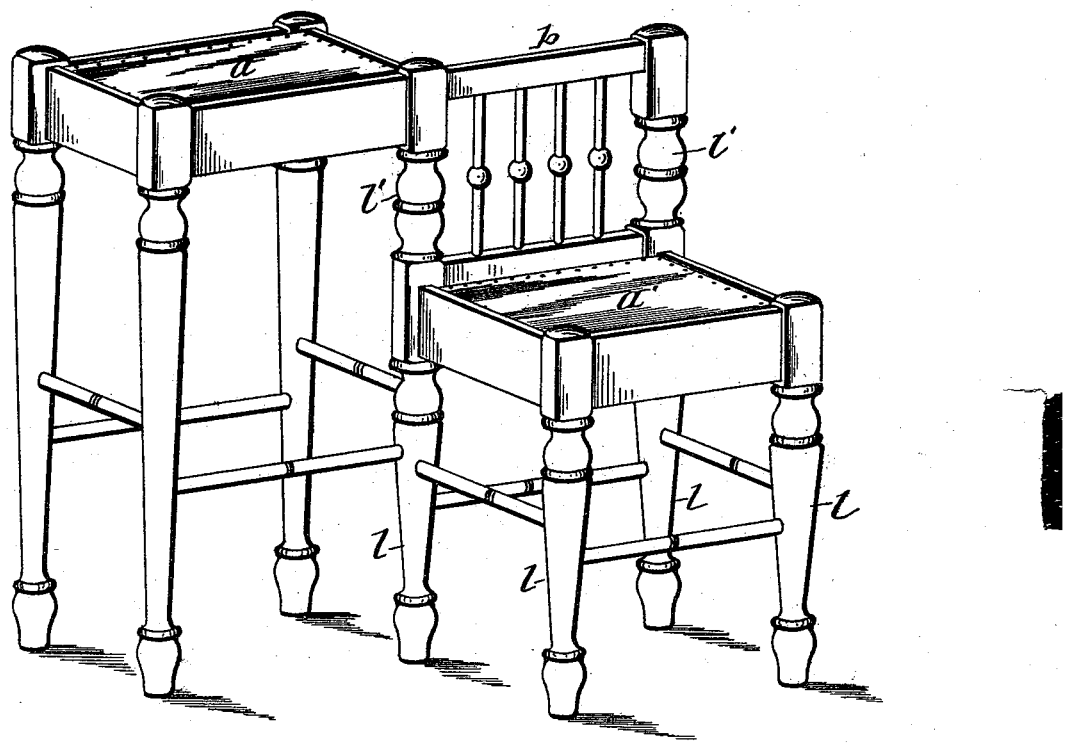
WITNESSES:
J. J. Laass
C. L. Bendixon
INVENTOR:
John Winter Sr.
By Hull, Laass & Hull
his ATTORNEYS.

UNITED STATES PATENT OFFICE.

JOHN WINTER, SR., OF SYRACUSE, NEW YORK.

PHOTOGRAPHIC POSING-CHAIR.

SPECIFICATION forming part of Letters Patent No. 506,025, dated October 3, 1893.

Application filed February 23, 1893. Serial No. 463,317. (No model.)

*To all whom it may concern:*

Be it known that I, JOHN WINTER, Sr., of Syracuse, in the county of Onondaga, in the State of New York, have invented new and useful Improvements in Photographic Posing Chairs, of which the following, taken in connection with the accompanying drawing, is a full, clear, and exact description.

This invention relates to a settee designed for posing groups of subjects to be photographed; and the invention consists in a novel, simple and inexpensive construction of a settee, which is very convenient for the aforesaid purpose as hereinafter fully described and set forth in the claims.

The annexed drawing represents a perspective view of a posing settee embodying my invention.

a— a'— represent two seats facing in one and the same direction and connected together and disposed with one at the side of and rearward from the other and in a higher plane, so that a person can be placed standing at the side of a person seated on the front seat —a'— and in front of a person seated on the rear seat —a— which latter supports its occupant at a sufficient elevation to bring the head of said occupant above the head of the person standing in front. At the same time another person can be placed standing at the rear of the front seat —a'— and thus present the head of said person above the occupant of said front seat. Hence a group of persons can be posed in a very convenient manner. It is obvious that another seat may be added and placed at the opposite side of the elevated rear seat —a— and in line with the front seat —a'— and thus the capacity of posing a group can be increased.

The front seat —a'— is supported on four legs —l—l—l—l— the rear legs of which are extended above the seat to serve as posts —l'—l'— for supporting the back —b—. One of these posts I make to serve the additional function of one of the front legs of the elevated rear seat —a—, the other front leg of the rear seat being correspondingly lengthened and arranged in a line extending laterally from the rear of the front seat and in range with the rear legs thereof. The rear legs of the rear seat are of the same length as the front legs of said seat and thus support the latter in a higher plane than the front seat —a'—.

The rear seat —a— I prefer to deprive of a back so that said seat may be used as a stand when desired.

Having described my invention, what I claim as new, and desire to secure by Letters Patent, is—

1. The improved photographic group-posing settee consisting of the legs —l—l—l—l—, the seat —a'— mounted on said legs, the extension —l'— of one of the rear legs of the aforesaid seat forming one of the front legs of the rear seat, a leg disposed in a line extending laterally from the rear of the seat —a'— and in range with the rear legs thereof and elongated to correspond to the height of the aforesaid extension and constituting the companion front leg of the rear seat, correspondingly elongated legs at the rear of the aforesaid front legs, and the seat —a— supported on said elongated legs in a higher plane than the front seat substantially as described and shown.

2. A photographic posing settee consisting of two seats both facing in the same direction and mounted upon supports of different heights, and disposed with the front support of the higher seat extending laterally from the rear support of the lower seat, thereby affording standing room for a person immediately in front of the higher seat adjacent to the side of the lower seat, and standing room for a person immediately back of the lower seat adjacent to the side of the higher seat, substantially as described.

In testimony whereof I have hereunto signed my name this 18th day of February, 1893.

JOHN WINTER, SR. [L. S.]

Witnesses:
H. M. SEAMANS,
C. L. BENDIXON.